United States Patent
King et al.

(10) Patent No.: US 11,370,919 B2
(45) Date of Patent: Jun. 28, 2022

(54) TREATED POROUS MATERIAL

(71) Applicant: Dow Global Technologies LLC, Midland, MI (US)

(72) Inventors: Stephen W. King, League City, TX (US); Xue Chen, Manvel, TX (US)

(73) Assignee: DOW GLOBAL TECHNOLOGIES, Midland, MI (US)

( * ) Notice: Subject to any disclaimer, the term of this patent is extended or adjusted under 35 U.S.C. 154(b) by 565 days.

(21) Appl. No.: 16/334,583

(22) PCT Filed: Sep. 28, 2017

(86) PCT No.: PCT/US2017/054001
§ 371 (c)(1),
(2) Date: Mar. 19, 2019

(87) PCT Pub. No.: WO2018/064326
PCT Pub. Date: Apr. 5, 2018

(65) Prior Publication Data
US 2021/0277244 A1 Sep. 9, 2021

Related U.S. Application Data

(60) Provisional application No. 62/401,974, filed on Sep. 30, 2016.

(51) Int. Cl.
| | | |
|---|---|---|
| C08L 97/02 | (2006.01) | |
| B27K 3/15 | (2006.01) | |
| C08L 63/04 | (2006.01) | |
| C08L 79/02 | (2006.01) | |
| B27K 3/34 | (2006.01) | |

(52) U.S. Cl.
CPC .............. *C08L 97/02* (2013.01); *B27K 3/15* (2013.01); *B27K 3/34* (2013.01); *C08L 63/04* (2013.01); *C08L 79/02* (2013.01); *B27K 2240/20* (2013.01); *B27K 2240/30* (2013.01); *B27K 2240/70* (2013.01); *B27K 2240/90* (2013.01); *C08L 2201/54* (2013.01)

(58) Field of Classification Search
CPC ............. C09D 163/00–10; C08L 79/02; C08L 2201/54; C08L 97/02; C08L 71/00; C08L 71/02; C08L 63/00–10; B27K 3/15; B27K 3/34–38
See application file for complete search history.

(56) References Cited

U.S. PATENT DOCUMENTS

| | | |
|---|---|---|
| 2010/0092782 A1 | 4/2010 | Perrier et al. |
| 2012/0301621 A1 | 11/2012 | Dombrowski et al. |

FOREIGN PATENT DOCUMENTS

| | | |
|---|---|---|
| WO | 2014004358 A3 | 10/2014 |
| WO | 2016003999 A1 | 1/2016 |
| WO | 2016105595 A1 | 6/2016 |
| WO | 2016105596 A1 | 6/2016 |
| WO | 2017003722 | 1/2017 |

OTHER PUBLICATIONS

Huntsman, Jeffamine D-230 Polyetheramine Technical Bulletin (2015).*
"OUDRAsperse™ WB 3001—Waterborne Epoxy Dispersion," Technical Data Sheet, Dow Maintenance & Protective Coatings, p. 1-5.
Ansari, F. et al. "Cellulose nanofiber network for moisture stable, strong and ductile biocomposites and increased epoxy curing rate." Composites Part A: Applied Science and Manufacturing, 2014, vol. 63, pp. 35-44.
Azzam, F. et al. "Preparation by grafting onto, characterization, and properties of thermally responsive polymer-decorated cellulose nanocrystals." Biomacromolecules, 2010, vol. 11, pp. 3652-3659. Abstract.

\* cited by examiner

*Primary Examiner* — Kregg T Brooks

(57) ABSTRACT

A method for preparing a treated cellulosic material comprising: providing a cellulosic material; a first treatment protocol comprising impregnating the cellulosic material with an aqueous solution comprising a polymer, the polymer comprising a water-soluble polyetheramine; and a second treatment protocol comprising impregnating the cellulosic material with a modifying agent, the modifying agent comprising an aqueous dispersion comprising an epoxy-containing resin.

8 Claims, No Drawings

TREATED POROUS MATERIAL

BACKGROUND

Porous materials, such as cellulosic materials, need to be protected from insect attack, rot and water impregnation to help preserve the physical properties of the cellulosic material. One example of such a cellulosic material is wood. A variety of treatment agents and preservation methods are known to preserve cellulosic materials.

Modern preservation methods typically involve pressure treating the cellulosic material with a treating agent. Pressure treatment typically allows the treating agent to penetrate throughout the porous structure of the cellulosic material. The treating agent is typically a chemical compound selected to impart the desired physical properties to the cellulosic material. For example, treating agents that increase hardness, add water resistance and improve the dimensional stability of the cellulosic material are of interest. Wood is capable of absorbing as much as 100% of its weight in water which causes the wood to swell, which after loss of water through evaporation causes the wood to shrink. This process of water absorption/evaporation is non-uniform and creates internal stresses in the wood leading to splitting, warping, bowing, crooking, twisting, cupping, etc. Also, water can serve as a pathway for organisms that degrade the cellulosic material, such as insects or fungus. Treating agents that repel insects, or minimize the formation of fungi, or improve the overall durability of the cellulosic material are of interest. Further, treating agents can improve wind resistance, ultraviolet radiation resistance, stability at high and low temperatures, pest resistance, fire resistance and other issues which might affect the physical properties of the cellulosic material.

An improved treating agent for cellulosic materials is desired.

SUMMARY

A method for preparing a treated cellulosic material comprising: providing a cellulosic material; a first treatment protocol comprising impregnating the cellulosic material with an aqueous solution comprising a polymer, the polymer comprising a water-soluble polyetheramine; and a second treatment protocol comprising impregnating the cellulosic material with a modifying agent, the modifying agent comprising an aqueous dispersion comprising an epoxy-containing resin.

DETAILED DESCRIPTION

As used herein, the term "porous material" refers to a material which is permeable such that fluids are movable therethrough by way of pores or other passages. An example of a porous material is a cellulosic material. Other examples of porous materials include stone, concrete, ceramics, and derivatives thereof. As used herein, the term "cellulosic material" refers to a material that includes cellulose as a structural component. Examples of cellulosic materials include wood, paper, textiles, rope, particleboard and other biologic and synthetic materials. As used herein, wood includes solid wood and all wood composite materials (e.g., chipboard, engineered wood products, etc.). Cellulosic materials generally have a porous structure that defines a plurality of pores.

As used herein, unless otherwise indicated, the phrase "molecular weight" refers to the weight average molecular weight. In some instance, the molecular weight is measured by GPC (Gel permeation chromatography).

A "treated cellulosic material" is a cellulosic material that has been treated with a treating agent to modify the properties of the cellulosic material. The properties modified by the treating agent include, but are not limited to, increased hydrophobicity, dimensional stability, fungi resistance, insect resistance, hardness, surface appearance, UV stability, fire resistance, and coatability. Increasing the hydrophobicity of a cellulosic material can provide other ancillary benefits, such as dimensional stability, by reducing the rate of water adsorption and evaporation, thus reducing the internal stresses of expanding and contracting.

A "treating agent" is a substance that, when combined with the cellulosic material, modifies the properties of the cellulosic material. In one instance, the treating agent comprises both a polymer and a modifying agent. The treating agent is applied to the cellulosic material. One method of applying the treating agent to the cellulosic material is through impregnation using pressure treatment. In one instance, the polymer is applied to the cellulosic material as part of a solution. Other methods of applying the treating agent are known, such as brushing, coating, spraying, dipping, soaking and extrusion. Once applied, the treating agent will permeate at least a portion of the pores of the cellulosic material.

As used herein, polymer refers to a molecule that is formed from one or more types of monomers. The polymer is preferably a copolymer or a mixture of copolymers and polymers. As used herein, copolymer may refer to an alternating copolymer, a periodic copolymer, a statistical copolymer, a random copolymer, a block copolymer, a graft copolymer, or other copolymer as is known. As used herein, copolymer refers to a polymer formed by uniting two or more monomers. Examples of copolymers include bipolymers, terpolymers, tetrapolymers, and other higher-ordered copolymers.

In one instance, the polymer comprises a water-soluble polyetheramine. As used herein, "water-soluble" means that the solution has at least 10 wt % of polyether-amine in water without phase separation, precipitation or solid residue. In one instance, the polyetheramine is a polyether monoamine. In one instance, the polyetheramine is a polyether diamine. In one instance, the polyetheramine is a mixture of polyether monoamine and polyether diamine. In one instance, the polyetheramine is selected with a molecular weight of less than 2000. In one instance, the polyetheramine is selected with a molecular weight of less than 1500. In one instance, the polyetheramine is selected with a molecular weight of less than 1000. In one instance, the polyetheramine is selected with a molecular weight of less than 500. Examples of polyetheramines useful for this invention include JEFFAMINES commercially available from Huntsman Corporation. These include all families of the JEFFAMINES including the M, D, ED, and EDR series products.

As used herein, the use of the term "(meth)" followed by another term such as acrylate refers to both acrylates and methacrylates. For example, the term "(meth)acrylate" refers to either acrylate or methacrylate; the term "(meth)acrylic" refers to either acrylic or methacrylic; and the term "(meth)acrylic acid" refers to either acrylic acid or methacrylic In one instance, the polymer is a constituent part of a solution. In one instance, the solution is a medium that comprises the polymer and water. The aqueous solution is prepared such that the viscosity of the aqueous solution is suitable for penetrating the pores of the cellulosic material for distribution through the cellulosic material. In one instance the viscosity of the solution is less than 5000 cP at ambient temperature. In one instance, the viscosity of the solution is less than 500 cP at ambient temperature. In one instance, the solution also comprises one or more additives. In one instance, any solids present in the solution are held in a stable suspension and are transportable by the dispersion into the pores of the cellulosic material. In one instance, the solid content of the polymer is 1 to 50 weight percent. In one instance, the solid content of the polymer is 15 to 45 weight percent. In one instance, the solid content of the polymer is 25 to 40 weight percent. In one instance, the solid content of the polymer is 30 to 40 weight percent.

The modifying agent is a substance that, when added to the porous material, improves the properties of the porous material. In one instance, the modifying agent is an epoxy-containing resin. In one instance, the epoxy-containing resin is an epoxy. In one instance the epoxy-containing resin is an epoxy imbibed thermoplastic polymer. An example of a commercially available epoxy imbibed thermoplastic polymer is Maincote™ AEH-10 (available from The Dow Chemical Company). In one instance, the epoxy portion of the epoxy-containing resin comprises a single epoxy. In one instance, the epoxy portion of the epoxy-containing resin comprises a mixture of epoxies. In one instance, the epoxy portion of the epoxy-containing resin is a diglycidyl ether of bisphenol A, the diglycidyl ether of bisphenol F, 1,4-butanediol diglycidyl ether, 1,6-hexanediol diglycidyl ether, the diglycidyl ester of phthalic acid, 1,4-cyclohexanedimethanol diglycidyl ether, 1,3-cyclohexanedimethanol diglycidyl ether, the diglycidyl ester of hexahydrophthalic acid, or a novolac resin, or a combination thereof. In one instance, the thermoplastic portion of the epoxy-containing resin comprises a (meth)acrylic latex. Monomers suitable for the preparation of acrylic latexes include acrylates and methacrylates such as methyl acrylate, ethyl acrylate, butyl acrylate, 2-ethylhexyl acrylate, methyl methacrylate, ethyl methacrylate, butyl methacrylate, and 2-ethylhexyl methacrylate, and combinations thereof.

In one instance, the modifying agent is an epoxy dispersion stabilized by an emulsifying agent. The dispersion is preferably an aqueous dispersion. The epoxy resin may be a solid epoxy resin or a liquid epoxy resin. In one instance the dispersion includes water, an epoxy resin, and one or more emulsifying agents. The aqueous dispersion is preferably a stable dispersion. A stable dispersion is a dispersion that, once formed, resists change in its properties over time and is therefore suitable for penetrating the pores of the cellulosic material. In one instance, the dispersion is substantially solvent-free, for example, having less than 1% by volume solvent. In one instance the aqueous dispersion has less than 0.1% by volume solvent. In one instance, the dispersion is solvent-free. Examples of the dispersion which are available commercially include OUDRASperse™, available from The Dow Chemical Company, e.g., OUDRASperse™ WB 3001, OUDRASperse™ WB 4001, and OUDRASperse™ WB 6001. In one instance, the emulsifying agent is a surfactant. In one instance the surfactant is nonionic, or anionic. In one instance the surfactant is an epoxy functional surfactant. An epoxy functional surfactant is a surfactant that contains a functionality that reacts with an epoxy containing material to become an integral part of the cured matrix. In one embodiment the surfactant is treated with an epihalohydrin or a multifunctional (di or higher) epoxide to give the epoxy functional surfactant. In one preferred embodiment the surfactant is treated with an epihalohydrin or a multifunctional (di or higher) epoxide is nonionic. Examples of nonionic surfactants include alkoxylated alcohols alkoxylated alkyl phenols, alkoxylated esters, alkoxylated acid esters, ethylene oxide/propylene oxide copolymers (block and random), amine alkoxylates, alkoxylated polyols, and thiols. In one instance the dispersion includes a combination of epoxy functional surfactants. In another instance the dispersion includes a combination of an epoxy functional surfactant and another surfactant. As used herein "EO" refers to ethylene oxide and "PO" refers to propylene oxide.

In one instance, the modifying agent is a constituent part of an aqueous dispersion. In one instance, the dispersion is a medium that comprises the modifying agent and water. The aqueous dispersion is prepared such that the suspended particle size in the dispersion is suitable for penetrating the pores of the cellulosic material for distribution through the cellulosic material. In one instance, the solids of the aqueous dispersion have an average particle size less than 50 micrometers. In one instance, the solids of the aqueous dispersion have an average particle size less than 500 nm. In one instance, the solids of the aqueous dispersion have an average particle size less than 350 nm. In one instance, the solids of the aqueous dispersion have an average particle size less than 250 nm. In one instance, the solids of the aqueous dispersion have an average particle size from 100 to 250 nm. In one instance, the dispersion also comprises one or more additives. In one instance, any solids present in the aqueous dispersion are held in a stable suspension and are transportable by the dispersion into the pores of the cellulosic material. In one instance, the solid content of the dispersion is 0.1 to 90 weight percent. In one instance, the solid content of the dispersion is 1 to 80 weight percent. In one instance, the solid content of the dispersion is 5 to 70 weight percent. In one instance, the solid content of the dispersion is 10 to 60 weight percent. In one instance, the solid content of the dispersion is 12 to 50 weight percent. In one instance, the solid content of the dispersion is 15 to 40 weight percent. The aqueous dispersion is prepared such that the viscosity of the epoxy-containing dispersion is suitable for penetrating the pores of the cellulosic material for distribution through the cellulosic material. In one instance, the viscosity of the solution is from 1 cP to 5000 cP at ambient temperature. In one instance, the viscosity of the solution is less than 1000 cP at ambient temperature.

In one instance, the aqueous solution comprising the polyetheramine is combined with the aqueous dispersion comprising the epoxy-containing resin to allow treatment of the porous material in a single step.

The treating agent is combined with the cellulosic material. In one instance, the treating agent is introduced to the cellulosic material by pressure treatment, as described herein. In another instance, the treating agent is introduced to the cellulosic material by other techniques known in the art, for example, brushing, dipping, soaking, spraying, and extrusion. The treating agent becomes impregnated in at least a portion of the pores of the cellulosic material, and thereby increases the weight of the cellulosic material. In one instance, the polymer increases the weight of the cellulosic material by 1 to 80 percent (as calculated after drying the cellulosic material). In one instance, the treating agent—the combination of the polymer and the modifying agent—increases the weight of the cellulosic material by 5 to greater than 100 percent (as calculated after drying the cellulosic material).

In one instance, the treating agent comprises one or more additives. The additive may be included as part of the solution containing the polymer, as part of the modifying agent, or may be included separately therefrom. Additives which are known to add properties to treated cellulosic materials are suitable, such as, flame retardants, dispersants and/or dyes. For example, the additives may be organic compounds, metallic compounds, or organometallic compounds. In one instance, the additive is a material which improves the wetting or penetration of the polymer into the wood, for example, solvents or surfactants (anionic, cationic or nonionic) that are stable in the dispersion. Examples of additives include, solvents, fillers, thickeners, emulsifiers, dispersing agents, buffers, pigments, penetrants, antistatic agents, odor substances, corrosion inhibitors, preservatives, siliconizing agents, rheology modifiers, anti-settling agents, anti-oxidants, other crosslinkers (e.g. diols and polyols), optical brighteners, waxes, coalescence agents, biocides and anti-foaming agents. Such fillers may include silica, $Ca(OH)_2$ or $CaCO_3$. In addition, the treating agent may be used in conjunction with wood preservatives containing, for example, cupric-ammonia, cupric-amine, cupric-ammonia-amine complexes, quaternary ammonium compounds, or other systems. For example, the treating agent may be used with Alkaline Copper-Quaternary ammonium (ACQ) preservative systems. The treating agent may also be used with wood preservative technologies which use zinc salts or boron containing compounds. Optionally, other additives such as insecticides, termiticides, and fungicides, may be added to the treating agent. In one instance, the additive is included as part of the dispersion and forms a stable suspension therewith. In one instance, one or more surfactant is added to the dispersion. In one instance, a surfactant is selected which reduces gelling of the polymer at the surface of the cellulosic material. In one instance, a surfactant is selected which increases the amount of polymer impregnated in the cellulosic material. For example, suitable surfactants may be nonionic, anionic, or cationic. Examples of nonionic surfactants include: alkoxylated alcohols, alkoxylated alkyl phenols, fatty acid esters, amine and amide derivatives, alkylpolyglucosides, ethylene oxide/propylene oxide copolymers, polyols and alkoxylated polyols. For example, a nonionic surfactant is TERGITOL™ L-62, commercially available from The Dow Chemical Company. Examples of anionic surfactants include: alkyl sulfates, alkyether sulfates, sulfated alkanolamides, alpha olefin sulfonates, lignosulfonates, sulfosuccinates, fatty acid salts, and phosphate esters. For example, an anionic surfactant is DOWFAX™ C10L, commercially available from the Dow Chemical Company. Examples of cationic surfactants include alkyltrimethylammonium salts.

In one instance, the cellulosic material is prepared as a treated cellulosic material by pressure treatment. The pressure used to pressure treat the cellulosic material may be either higher or lower than atmospheric pressure. In one instance, the pressure is lower than ambient pressure, for example, 0.0001 to 0.09 MPa (0.75 to 675 mmHg). In another instance, the pressure is greater than ambient pressure, for example, 0.1 to 1.7 MPa (750 to 12750 mmHg). It is envisioned that pressure treatment processes known in the art are suitable for impregnating the cellulosic material with the treating agent. The temperature for the pressure treatment may be performed at a range of temperatures, for example, from ambient to 150° C.

In one instance, the treated cellulosic material is prepared according to at least a first treatment protocol and a second treatment protocol. In one instance, the first treatment protocol comprises impregnating the cellulosic material with the polymer. The first treatment protocol comprises one or more of the following steps: (a) depositing the cellulosic material in a vessel; (b) holding the vessel at vacuum for 5 to 60 minutes; (c) introducing the polymer to the vessel; (d) pressurizing the vessel to 1.03 MPa for 5 to 60 minutes; (e) draining the excess polymer; (f) optionally removing excess polymer by vacuum and (g) air drying the cellulosic material at 20 to 60° C. for 24 to 48 hours. In one instance, the polymer is part of the aqueous dispersion. In one instance, step (d) is performed at ambient pressure.

In one instance, the product of the first treatment protocol is subsequently prepared according to a second treatment protocol that impregnates the cellulosic material with the modifying agent. The second treatment protocol comprises one or more of the following steps: (a) depositing the cellulosic material prepared according to the first treatment protocol in a vessel; (b) introducing the modifying agent to the vessel; (c) holding the vessel at either vacuum or increased pressure for 5 to 60 minutes; (d) optionally removing excess modifying agent by vacuum; and (e) air drying the cellulosic material at 60° C. for 24 to 48 hours. In one instance, the first treatment protocol and the second treatment protocol are combined whereby step (c) of the first treatment protocol is modified to also include the modifying agent.

The several drying steps may be performed at a range of temperatures, whereby the duration of the air drying step is proportional to the temperature. Suitable air-drying temperatures are between room temperature (roughly 20° C.) and 180° C. The drying may be performed in air, in nitrogen, or other suitable atmosphere.

A water immersion test is used to determine the water repellency of the treated cellulosic material according to the American Wood Protection Association Standard E4-11 procedure (Standard Method of Testing Water Repellency of Pressure Treated Wood). The water immersion test involves first, providing both a treated wafer, comprising a treated cellulosic material prepared as described herein, and a control wafer, comprising a cellulosic material treated according to the first treatment protocol described herein except that the dispersion is replaced by distilled water; second, measuring the tangential dimension of both the treated wafer and the control wafer to provide an initial tangential dimension ($T_1$) (where the tangential dimension is perpendicular to the direction of the grain of the cellulosic material); third, placing both the treated wafer and the control wafer in a conditioning chamber maintained at 65±3% relative humidity and 21±3° C. until a constant weight is achieved; fourth, immersing both the treated wafer and the control wafer in distilled water at 24±3° C. for 30 minutes; and fourth, measuring the tangential dimension of both the treated wafer and the control wafer following removal from the water to provide a post tangential dimension ($T_2$).

DoN refers to the degree of neutralization of the carboxylic acid functionality in the polymer.

The percent swelling (S) for each individual wafer (both the treated wafer and the control wafer) is calculated as:

$$S(\%) = \frac{T_2 - T_1}{T_1} \times 100$$

In each of the Examples herein, the percent swelling of the control wafer is 3.0%.

Water-repellency efficiency (WRE) is used to determine the effectiveness of the treating agent in adding water repellant properties to the treated cellulosic material. WRE is calculated as:

$$WRE(\%) = \frac{S_1 - S_2}{S_1} \times 100$$

$S_1$ refers to the percent swelling of the untreated wafer; $S_2$ refers to the percent swelling of the treated wafer. According to E4-11, for most outdoor applications a minimum WRE of 75% is preferred.

The following Examples illustrate certain aspects of the present disclosure, but the scope of the present disclosure is not limited to the following Examples.

Materials

Epoxy Imbibed Thermoplastic Polymer Aqueous Dispersion. Maincote™ AEH-10 is a commercially available hybrid water dispersion of a Styrene Acrylic Latex with 30% Bisphenol A epoxy resins (available from the Dow Chemical Company). The Maincote™ AEH-10 has a solids content of 53%, an Epoxy Equivalent weight (EEW) of 1180 as supplied, a minimum film formation temperature (MFFT) of about 13° C. and a viscosity of less than 400 cPs. The dispersion was diluted to 30% solids by the addition of water. This dispersion is referred to below as "EITP".

OUDRASperse™ WB 3001 is a commercially available waterborne dispersion of a liquid epoxy resin, manufactured without added solvent, having the following properties: Solids content: 64%; Epoxy Equivalent Wt: 310 g/eq; MFFT; <0; Viscosity: 3800 CP; Density: 1.10 kg/L; Appearance: Milky White. The solids content was adjusted to 40% by the addition of water. This dispersion is referred to below as "WB 3001".

Polyetheramine 1. Jeffamine M-1000 is a commercially available product from Huntsman and is a polyether monoamine which has an approximate molecular weight of 1000, and a PO/EO mole ratio of 3/19. The material was diluted with water to 30 wt. percent. This dispersion is referred to below as "PEA 1".

Polyetheramine 2. Jeffamine ED-900 is a commercially available product from Huntsman and is a polyether diamine which has an approximate molecular weight of about 900, and a EO/PO mole ratio of 12.5/6.0. The material was diluted with water to 30 wt. percent. This dispersion is referred to below as "PEA 2".

Wood Treatment. Seven southern yellow pine blocks (4 cm*2 cm*0.5 cm) are provided, and six blocks individually pressed down by a ring in an evacuated Parr reactor for half an hour followed by drawing in 80 ml of the either PEA 1 or PEA 2 as defined in Table 1. The reactor is pressurized to 150 psi under nitrogen and maintained for 60 min. The impregnated wood blocks are then placed in an oven in air at 60° C. for 48 h.

Two of the treated blocks are withheld from this procedure and used as a control (one treated with PEA 1, one treated with PEA 2). The remaining four treated wood blocks are each post-treated with the EITP dispersion by first pressing the wood block down by a ring in an evacuated Parr reactor for half an hour followed by drawing in 80 ml of the EITP dispersion. The reactor is pressurized to 150 psi under nitrogen and maintained for 60 min. The impregnated wood blocks are then placed in an oven in air at 60° C. for 48 h.

A leaching test is performed by washing the wood blocks with deionized water at 35° C. for 8 hours and then dried in an oven at 60° C. overnight. The dimensional stability of the dried wood was then conducted following the AWPAS E4-11 procedure, with results listed in Table 1.

| Sample | Aqueous solution | Modifying Agent | Percentage of swelling (Initial) | WRE (initial) | Percentage of swelling (leached) | WRE (leached) |
|---|---|---|---|---|---|---|
| Control 1 | None | no | 3.0% | 0% | 3.0% | 0% |
| Control 2 | PEA 1 | No | 0.29% | 90.4% | 2.3% | 23.8% |
| Control 3 | PEA 2 | No | 0.63% | 79% | 3.2% | −7.3% |
| 1 | PEA 1 | EITP | 0.3% | 90.1% | 1.7% | 43.8% |
| 2 | PEA 2 | EITP | 0.19% | 93.7% | 1.3% | 56% |
| 3 | PEA 1 | WB 3001 | 0.2% | 94.2% | 0.67% | 77.5% |
| 4 | PEA 2 | WB 3001 | 0.19 | 93.7 | 0.01% | 99.6% |

As the table shows, treating wood with a polyetheramine initially provides a good water-repellency efficiency (WRE), but when leached with water the WRE is not good. However, with the addition of a modifying agent (EITP or WB 3001) the material retains a good WRE after leaching with water. These results, without being limited by theory, suggest that the EITP or WB 3001 can either react with the polyetheramine to keep it from leaching with water or is able to coat the pores of the wood to keep the polyetheramine from leaching.

The invention claimed is:

1. A method for preparing a treated cellulosic material comprising:
   (a) providing a cellulosic material;
   (b) conducting a first treatment protocol comprising impregnating the cellulosic material with an aqueous solution comprising a polymer, the polymer comprising a water-soluble polyetheramine; and
   (c) subsequently conducting a second treatment protocol comprising impregnating the cellulosic material with a modifying agent, the modifying agent comprising an aqueous dispersion comprising an epoxy-containing resin.

2. The method of claim 1, wherein the polyetheramine is a polyether monoamine or a polyether diamine.

3. The method of claim 1, wherein the epoxy-containing resin is an epoxy or an epoxy imbibed thermoplastic polymer.

4. The method of claim 3, wherein the thermoplastic polymer portion of the epoxy imbibed thermoplastic polymer formulation is an acrylic latex.

5. The method of claim 1, wherein the epoxy-containing resin is a diglycidyl ether of bisphenol A, the diglycidyl ether of bisphenol F, 1,4-butanediol diglycidyl ether, 1,6-hexanediol diglycidyl ether, the diglycidyl ester of phthalic acid, 1,4-cyclohexanedimethanol diglycidyl ether, 1,3-cyclohexanedimethanol diglycidyl ether, the diglycidyl ester of hexahydrophthalic acid, or a novolac resin, or a combination thereof.

6. The method of claim 1, further comprising impregnating the cellulosic material with an additive.

7. The method of claim 1, further comprising coating the cellulosic material with a sealing agent.

8. The method of claim 1, wherein at least one of the impregnation steps of the first treatment protocol and the second treatment protocol are conducted under pressure greater than or lower than ambient.

* * * * *